United States Patent Office 3,426,089
Patented Feb. 4, 1969

3,426,089
POLYMERIZATION PROCESS
Armand J. de Rosset, Clarendon Hills, Ill., assignor to Universal Oil Products Company, Des Plaines, Ill., a corporation of Delaware
No Drawing. Filed Aug. 30, 1966, Ser. No. 575,987
U.S. Cl. 260—666          8 Claims
Int. Cl. C08f 1/72, 5/00, 3/14

ABSTRACT OF THE DISCLOSURE

Unsaturated hydrocarbons can be polymerized by contact with a catalyst prepared by chemically combining a subfluoride vapor, such as aluminum subfluoride, with a refractory inorganic oxide, such as crystalline alumina modifications.

---

This invention relates to a conversion process for the polymerization of an unsaturated organic compound into more useful compounds. More specifically, this invention is concerned with a conversion process for the polymerization of an unsaturated organic compound utilizing a novel catalyst comprising a refractory oxide chemically combined with a metal subfluoride vapor.

It is therefore an object of this invention to provide a process for the polymerization of an unsaturated organic compound utilizing a novel polymerization catalyst.

A specific object of this invention is to provide a novel method and a novel catalyst for polymerizing an unsaturated organic compound to provide the desired polymerized product in high yields.

One embodiment of the invention relates to a conversion process which comprises polymerizing an unsaturated organic compound at a temperature in the range of from about 0° to about 450° C. and a pressure in the range of from about atmospheric to about 200 atmospheres in contact with a catalyst comprising a refractory oxide chemically combined with a metal subfluoride vapor.

Other objects and embodiments referring to alternative polymerizable unsaturated organic compounds and to alternative catalytic compositions of matter will be found in the following further detailed description of the invention.

It has now been discovered that unsaturated organic compounds and particularly olefinic hydrocarbons may be converted to other and more useful compounds by contacting said olefinic hydrocarbons with certan catalytic compositions of matter which are prepared by specific methods. Examples of olefinic hydrocarbons which may be converted according to the process of this invention include monoolefins such as ethylene, propylene, 1-butene, 2-butene, 2-methyl-1-butene, 2-methyl-2-butene, 1-pentene, 2-pentene, 3-pentene, 2-methyl-pentene, 3-methyl-1-pentene, 2-methyl-2-pentene, 3-methyl-2-pentene, 1-hexene, 2-hexene, 3-hexene, 2-methyl-1-hexene, 3-methyl-1-hexene, 4-methyl-1-hexene, 2-methyl-2-hexene, 3-methyl-2-hexene, 4-methyl-2-hexene, 2-methyl-3-hexene, 3-methyl-3-hexene, 1-heptene, 2-heptene, 3-heptene, 2-methyl-1-heptene, 3-methyl-1-heptene, 4-methyl-1-heptene, 2-methyl-2-heptene, 3-methyl-2-heptene, etc., and mixtures thereof; polyolefins such as 1,3-butadiene, 2-methyl-1,3-butadiene, 1,3-pentadiene, 2-methyl-1,3-pentadiene, 1,4-pentadiene, 2-methyl-1,4-pentadiene, 1,3-hexadiene, 1,4-hexadiene, 2-methyl-1,3-hexadiene, etc., and mixtures thereof; and cycloolefins such as cyclopentene, cyclohexene, cycloheptene, etc., and mixtures thereof.

As hereinbefore set forth, the invention is concerned with a conversion process for the polymerization of unsaturated organic compounds, said process being effected in the presence of a catalyst which possesses a high degree of hydrocarbon conversion activity and is particularly effective as a polymerization catalyst for the unsaturated organic compounds hereinabove set forth. The catalyst comprises a refractory inorganic oxide chemically combined with a metal subfluoride vapor. Satisfactory refractory oxides for the preparation of catalysts for use in the process of this invention include high surface area crystalline alumina modifications such as gamma-, eta- and theta-alumina, although these are not necessarily of equivalent suitability. By the term high surface area is meant a surface area measured by adsorption techniques within the range of from about 25 to about 500 more square meters per gram and preferably a surface area of approximately 100 to 300 square meters per gram. In addition to the aforementioned gramma-, eta- and theta-aluminas which may be utilized as solid supports, it is also contemplated that other refractory oxides such as silica, zirconia, magnesia, thoria, etc., and combinations of refractory oxides such as silica-alumina, silica-magnesia, alumina-silica-magnesia, alumina-thoria, alumina-zirconia, etc., may also be utilized as solid supports for the catalyst of the present invention.

As set forth hereinabove, the catalyst comprises a refractory inorganic oxide that is combined with a metal subfluoride vapor to effect chemical combination of the refractory inorganic oxide with said metal subfluoride vapor. Particularly preferred metal subfluorides include the aluminum subfluorides including aluminum monofluoride and silicon subfluorides including silicon difluoride due mainly to the relative ease in preparing these compounds although the invention is not restricted to their use, but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

It is a feature of the present invention that the finished catalyst of the present invention prepared as hereinafter set forth has increased structural strength and a high degree of stability due to the immobility of the components of the finished catalysts inasmuch as chemical combination of the refractory inorganic oxide with the metal subfluoride vapor is accomplished as hereinafter described.

The catalyst of the present invention comprises a metal subfluoride vapor chemically combined with the refractory inorganic oxide so as to effect chemical combination of the refractory inorganic oxide with the metal subfluoride vapor, and as hereinbefore set forth, it is the particular association of these components which results in the unusual catalytic properties of this catalyst. The metal subfluoride vapor may be chemically combined with the refractory inorganic oxide at temperatures in the range of 650° C. to about 1200° C. and at a pressure of from about subatmospheric to about 7 atmospheres. The formation of the metal subfluoride vapor, and especially the formation of aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 800° C. The refractory inorganic oxide which is then chemically combined with the aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the refractory inorganic oxide catalyst support and then heating in vacuum in a furnace tube at elevated temperatures.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the unsaturated organic compound is continuously charged to a reaction zone containing a fixed bed of the desired catalyst, said zone being maintained at the proper operating conditions of temperature and pressure, that is, a temperature in the range of from about 0° to about 450° C. or more and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with an adsorbent packing material. The charge passes through the catalyst bed in either an upward or downward flow and the polymerized product is continuously withdrawn, separated from the reactor effluent, and recovered, while any unreacted starting materials may be recycled to form a portion of the feed stock. It is also contemplated within the scope of this invention that reaction gases such as hydrogen, helium, nitrogen, argon, etc., may also be charged to the reaction zone if desired. Another continuous type operation comprises the moving bed type in which the unsaturated organic compound and the catalyst bed move either concurrently or countercurrently to each other while passing through said reaction zone.

Still another type of operation which may be used is the batch type operation in which a quantity of the unsaturated organic compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

EXAMPLE I

A quartz vessel with provisions for connection to a vacuum system was filled with a mixture of about 50 grams of $\frac{1}{16}$ inch alumina spheres and about 10 grams of $\frac{1}{8}$ inch pellets comprising about 20% aluminum metal and about 80% aluminum monofluoride by weight. The contents of the vessel were outgassed at a pressure of less than $10^{-4}$ mm. while slowly being heated in a tube furnace. Approximately 4 hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the catalyst spheres were separated from the pellets and the catalyst was then placed in vessels which were then sealed. A fluoride level of about 3.2 weight percent was achieved. This catalyst was designated as catalyst A.

EXAMPLE II

In this example, a volatile fluoride (800° C.) was prepared by sweeping with helium a stoichiometric mixture of aluminum metal (melting point 660° C.) and aluminum trifluoride (melting point greater than 1000° C.) which was heated to 750–800° C. Aluminum monofluoride was then produced. A catalyst base in the form of $\frac{1}{16}$ inch alumina spheres was then placed in the downstream helium flow and the aluminum monofluoride was chemically combined with the alumina base at a temperature in excess of 650° C.

The catalyst produced by this vapor deposition and chemical combination of the aluminum monofluoride with the alumina had fluoride levels of between 0.01 and 1.1 percent by weight of fluoride chemically combined therewith. This catalyst was designated as catalyst B.

EXAMPLE III

The catalyst prepared according to Example I above and designated as catalyst A is utilized in a polymerization reaction zone to determine the polymerization activity of said catalyst. In this experiment, a portion of the catalyst prepared according to the method of Example I is placed in the reaction zone which is provided with heating means. In the experiment, a 1:1 molar propane-propylene mirture is charged to the polymerization reactor. The reactor is maintained at about 500 p.s.i.g. and about 340° C. Substantial olefin conversion is obtained. The liquid product is analyzed using gas-liquid chromatography and it is found that the product comprises propylene trimer, propylene tetramer, and intermediate and higher cuts.

EXAMPLE IV

The catalyst prepared according to Example II and designated as catalyst B is utilized in a polymerization reaction zone, a portion of the finished catalyst being placed in the polymerization apparatus. In the experiment, a 1:1 molar butylene-butane feed mixture is charged to the polymerization zone which is maintained at about 360° C. at about 500 p.s.i.g. pressure. Substantial conversion of the olefin is obtained, the product comprising mainly octenes with small amounts of higher polymers.

EXAMPLE V

In this example, a fresh portion of catalyst A was utilized in the polymerization of cyclohexene. In this experiment, the catalyst was placed in the same apparatus used previously. Cyclohexene was charged to the polymerization reactor which was maintained at about 600 p.s.i.g. and about 350° C. Substantial olefin conversion was obtained.

I claim as my invention:

1. A conversion process which comprises polymerizing an olefinic hydrocarbon at a temperature in the range of from about 0° to about 450° C. and a pressure in the range of from about atmospheric to about 200 atmospheres in contact with a catalyst comprising a refractory inorganic oxide which has been chemically combined with a subfluoride vapor selected from the group consisting of aluminum and silicon subfluorides.

2. The process of claim 1 further characterized in that said subfluoride is aluminum monofluoride.

3. The process of claim 2 further characterized in that said refractory inorganic oxide comprises alumina.

4. The process of claim 2 further characterized in that said refractory inorganic oxide comprises silica-alumina.

5. The process of claim 4 further characterized in that said olefinic hydrocarbon is propylene.

6. The process of claim 4 further characterized in that said olefinic hydrocarbon is butene-1.

7. The process of claim 4 further characterized in that said olefinic hydrocarbon is isobutylene.

8. The process of claim 4 further characterized in that said olefinic hydrocarbon is cyclohexene.

References Cited

UNITED STATES PATENTS

| | | | |
|---|---|---|---|
| 2,195,747 | 4/1940 | Keunecke et al. | 260—683.15 |
| 2,970,133 | 1/1961 | Sistrunk | 252—442 X |
| 2,861,960 | 11/1958 | De Boer et al. | 252—442 X |
| 3,153,634 | 10/1964 | Thomas | 252—442 X |
| 3,193,596 | 7/1965 | Bown et al. | 260—683.15 |
| 3,243,473 | 3/1966 | Engelbrecht et al. | 260—683.15 |
| 3,296,331 | 1/1967 | Kovach | 260—683.15 |

PAUL M. COUGHLAN, JR., *Primary Examiner.*

U.S. Cl. X.R.

260—683.15, 680; 252—442